US007222547B2

(12) United States Patent
Alley

(10) Patent No.: US 7,222,547 B2
(45) Date of Patent: May 29, 2007

(54) AUTO-SEALING SPECIMEN CONTAINER

(76) Inventor: Kenneth A. Alley, 311 Foundryville, Berwick, PA (US) 18603

( * ) Notice: Subject to any disclaimer, the term of this patent is extended or adjusted under 35 U.S.C. 154(b) by 0 days.

(21) Appl. No.: 10/835,239

(22) Filed: Apr. 28, 2004

(65) Prior Publication Data

US 2004/0228767 A1 Nov. 18, 2004

Related U.S. Application Data

(63) Continuation-in-part of application No. 10/002,313, filed on Oct. 24, 2001, now Pat. No. 6,786,106.

(60) Provisional application No. 60/465,885, filed on Apr. 28, 2003.

(51) Int. Cl.
*G01N 1/00* (2006.01)

(52) U.S. Cl. .................................... 73/864.81; 604/318

(58) Field of Classification Search ............ 73/864.51, 73/864.81, 864.91, 863.85, 864.63; 422/68.1, 422/102, 61, 58, 50, 55, 56; 436/165, 108; 604/404, 318; 220/506, 526
See application file for complete search history.

(56) References Cited

U.S. PATENT DOCUMENTS

| | | | | |
|---|---|---|---|---|
| 3,872,996 | A * | 3/1975 | Dogliotti | 220/254.7 |
| 4,989,746 | A * | 2/1991 | Pierce | 220/254.3 |
| 6,644,490 | B2 * | 11/2003 | Clarke | 220/254.1 |
| 6,669,908 | B2 * | 12/2003 | Weyker et al. | 422/58 |
| 6,680,027 | B2 * | 1/2004 | Kang et al. | 422/58 |
| 6,740,293 | B1 * | 5/2004 | Deng | 422/58 |
| 6,786,106 | B2 * | 9/2004 | Alley | 73/864.51 |

* cited by examiner

*Primary Examiner*—Robert Raevis
(74) *Attorney, Agent, or Firm*—Law Offices of Mark A. Garzia, P.C.; Mark A. Garzia

(57) ABSTRACT

An apparatus for testing a specimen. The apparatus having means for withdrawing a small sample of the specimen thereby preventing the potential contamination of the majority of the specimen.

5 Claims, 4 Drawing Sheets

FIG 4 A
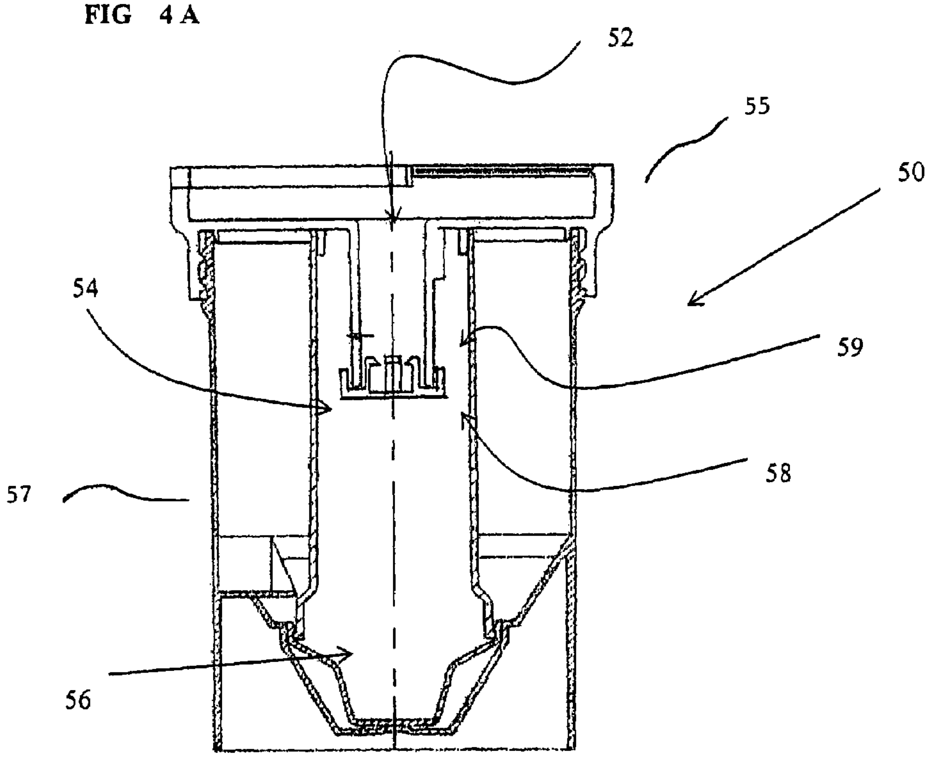
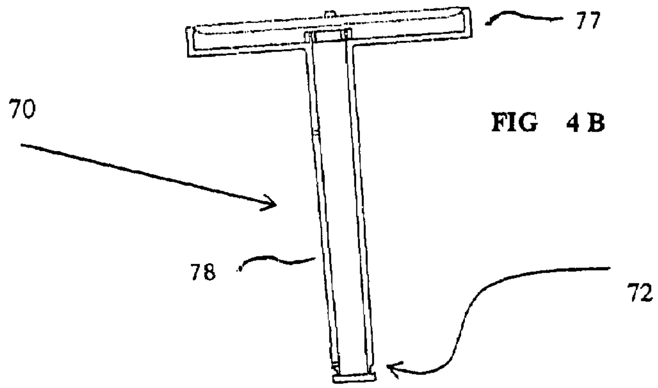
FIG 4 B

AUTO-SEALING SPECIMEN CONTAINER

CROSS REFERENCE TO RELATED APPLICATIONS

The present application is a continuation-in-part of, and claims the benefit under all relevant U.S. statutes, including 35 U.S.C. §120, to U.S. application Ser. No. 10/002,313 filed Oct. 24, 2001, titled APPARATUS FOR SAMPLING AND TESTING A SPECIMEN, in the name of Kenneth Alley, now U.S. Pat. No. 6,386,106, issued Sep. 7, 2004. The present application also claims the benefits under 35 U.S.C. §119(e) of U.S. Provisional Application No. 60/465,885 filed Apr. 28, 2003, titled ALLEY-AUTO SEALING APPARATUS FOR USE WITH DIAGNOSTIC TESTING CASSETTES in the name of Kenneth A. Alley.

U.S. application Ser. No. 10/002,313 filed Oct. 24, 2001 (now U.S. Pat. No. 6,786,106, issued Sep. 7, 2004), and U.S. Provisional Application No. 60/465,885 filed Apr. 28, 2003, are hereby incorporated by reference as if fully set forth herein.

FIELD OF THE INVENTION

The present invention relates generally to specimen collection and testing devices and, more specifically, to a self-contained, tamper-proof specimen testing system.

BRIEF DESCRIPTION OF THE PRIOR ART

More companies are requiring new employees to undergo pre-employment drug testing before hiring. Also, post-accident drug testing is almost routine, especially when flammable or hazardous waste hauling is involved, or where the safety of a large number of people are concerned (e.g., oil tanker captain, truck driver or high-speed train engineer). Normally, a urine specimen is taken and tested by a local lab. If the test turns up positive, the specimen must then be sent to a more sophisticated, usually remotely located, testing lab.

Companies that manufacture drug testing systems have developed specimen collection containers designed to be used with test cassettes. The test cassettes have reagent test strips attached thereto that change color in the presence of certain chemicals. The test cassettes must be submerged into the specimen collection container holding the liquid specimen. If the test results are positive, the cassettes are then removed and a lid is placed over the container prior to sending the remaining specimen to another lab for confirmation. Some companies incorporate a slot on top of the lid to slide the test cassette through, and if the test is positive, the entire lid must be replaced with a leak-proof lid.

SUMMARY OF THE INVENTION

The present invention is a specialized container system that communicates with both typical testing cassettes and specialized split sample test cassettes also part of this invention. The system includes means to automatically seal the specimen container after the removal of the testing cassette. Unlike the AlleyBioSystems, totally self-contained, tamper-proof screening, testing and storage apparatus, the present invention is adapted to incorporate typical card style cassettes commonly used for diagnostic testing purposes. The auto sealing system may also be adapted to include the AlleyBio Isolator system, thus, splitting the sample and if desired, the untested portion of the sample may be preserved for future testing. The present invention may also be adapted to work with several geometric shapes including the round cassette that AlleyBio developed for its specialized toxicity cup technology. The present invention consists of a typical specimen container, a test cassette with means to communicate with the apparatus, a specialized closure that attaches to the specimen container, and a unique plug that communicates with both, the closure and the testing cassette.

In order to ensure that there has been no tampering with the specimen and to prevent contamination of the specimen, AlleyBioSystems has developed a self-contained screening device. The self-contained screening device comprises a specimen container having a screw-top closure and a cassette with a single test strip or a plurality of reagent test strips that is encapsulated within the closure. The closure communicates with the cassette thus, providing means to activate the test when desired.

The present invention does not require opening the specimen container during testing or prior to sending the sample out for confirmation, thus preventing to potential for cross contamination and or exposure to a bio-hazardous specimen. It also, improves the validity of the results by controlling access to the specimen.

The present invention relates generally to specimen collection and testing devices, more specifically the specimen collection system includes a unique closure system that communicates with typical testing cassettes and with specialized testing cassettes claimed in this application. The specimen collection system provides means to safely access the specimen with a testing cassette and upon removal of the cassette the system is automatically sealed. The split specimen cassette separates the bulk specimen from the tested specimen. This system minimizes the potential for cross contamination and improves the chain of custody related to Drug of Abuse devices.

After a patient has provided a specimen, the container can be sealed with the specially designed closure to prevent tampering and to prevent the accidental spilling of the specimen. When the cassette is engaged on to the closure, the test may be conducted without having to remove the closure. Additionally, after the test is preformed the cassette may be removed, thus simultaneously the container is automatically resealed and if necessary the entire container may be sent to a remote laboratory for confirmation testing.

The present invention also consists of a specialized cassette designed to communicate with the closure and plug system. The specialized cassette consists of the described locking means to communicate with the plug and closure and additionally the cassette is adapted to a separate housing/cover that incorporates a wick. When the cassette is submerged into a specimen cup the wick is the only portion that contacts the sample specimen, thus splitting the specimen. The test strips never come into physical contact with the bulk specimen. (All other existing cassettes that are designed to dip into a specimen container actually submerge the bottom of the test strip into the bulk specimen, potentially contaminating the remaining specimen. In order to assure that the specimen is completely unadulterated the specimen would need to be split prior to dipping a test strip into the bulk specimen). The present invention provides a cassette that does not allow the test strips to contact the bulk specimen. The cassette consists of a strip holder and a housing that incorporates a wick. When the wick is submerged the cassette's test strips are isolated within the housing, thus physically separated. When the cassette is removed, the plug seal of the closure seals the container and then the cassette test strips move (slide) relative to the wetted wick, thus activating the test strips.

(Note: The Wick is in the cover in the drawings, although it may be desired to place the wick on the cassette slide and the test strips on the housing cover, thus when the 2 separate components slide together the wick makes contact with the test strips. This particular configuration would be desired, if there was and over cap (or a pull tab at the top of the cassette to activate the test) to push to two components together to activate the test verses the plug system in the closure that pulls onto the cassette slide).

The cassette or the wick may move relative to one another in order for the two components to make physical contact. The cassette has its own isolator system built into its design. As noted, such a cassette may also be adapted to communicate with an over-cap instead of a cup system. An over cap system may be more desirable for saliva or blood specimens where a buffer or reagent may be introduced when placing the cap over the specimen pad.

BRIEF DESCRIPTION OF THE DRAWINGS

The foregoing summary, as well as the following detailed description may be better understood when read in conjunction with the accompanying drawings, which are incorporated in and form a part of the specification. The drawings serve to explain the principles of the invention and illustrate embodiments of the present invention that are preferred at the time the application was filed. It should be understood, however, that the invention is not limited to the precise arrangements and instrumentalities shown.

In the drawings:

FIG. 4A is a side perspective view of another embodiment of the ALLEY-auto sealing, tamper-proof screening, testing and storage apparatus with the Alley Isolator system adapted to the round cassette style of the Alley Toxicity Cup.

FIG. 4B is a side perspective view of the round style cassette used in the Alley Toxicity Cup. The unique cassette may incorporate a test strip that is flexed (oriented) and operates in multiple planes. This cassette may be adapted to the closure described in FIG. 4A, of the ALLEY-auto sealing, tamper-proof screening, testing and storage apparatus with or without the Alley Isolator system adapted.

DETAILED DESCRIPTION OF THE PREFERRED EMBODIMENT

Figure 1:
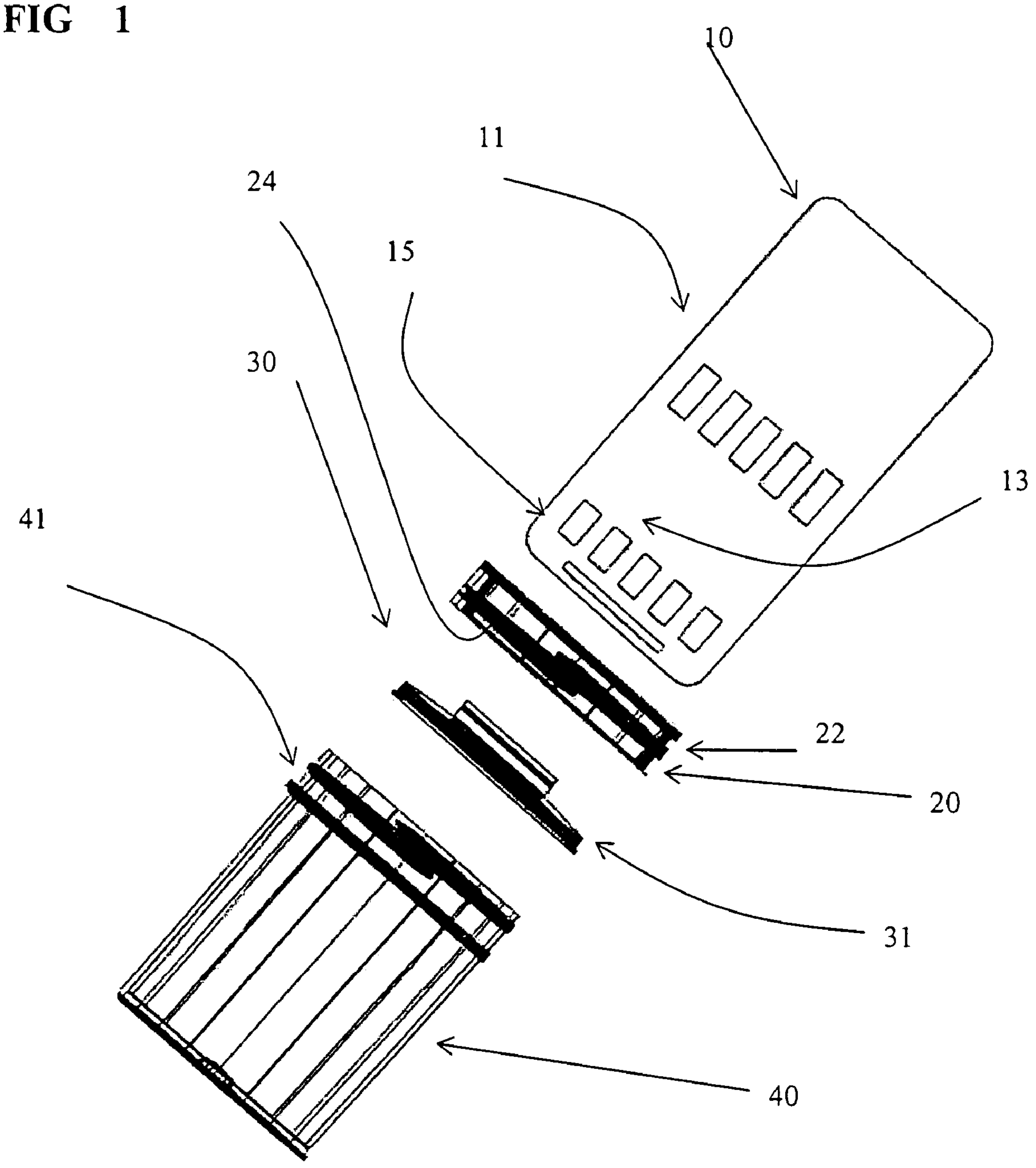
FIG. 1 is a stacked side view of the ALLEY-auto sealing, tamper-proof screening, testing and storage apparatus.

Referring now to FIG. 1, an apparatus for screening for the presence of drugs is shown. The apparatus consists of a test cassette 10 a lid 20, a plug 30 and a specimen container 40.

The container 40 has a closed end and an open end. The lid 20 is designed to attach to the open end of the container 40 in order to close off the open end, thereby preventing the specimen stored in the container from escaping. In a preferred embodiment, the lid 20 is screwed onto the container 40; however, one skilled in the art could develop other means for attaching the lid to the container for example, snapping the lid over the container (for example, snapping the lid over the container's edges).

In the present embodiment, the plug 30 snaps into the bottom of closure 20 prior to placing the closure onto the specimen container 40.

A patient deposits a specimen into container 40. The container 40 is sealed with the specially designed lid 20 in order to store the specimen until a lab worker can test the specimen. The sealed container also prevents leakage of the specimen.

Figure 2:
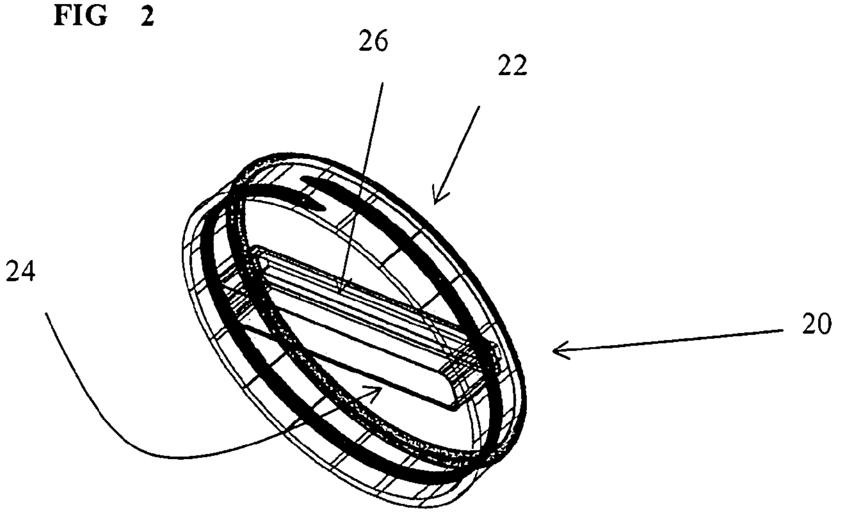
FIG. 2 is a top perspective view of the unique closure of the ALLEY-auto sealing, tamper-proof screening, testing and storage apparatus shown in FIG. 1.
Figure 3:
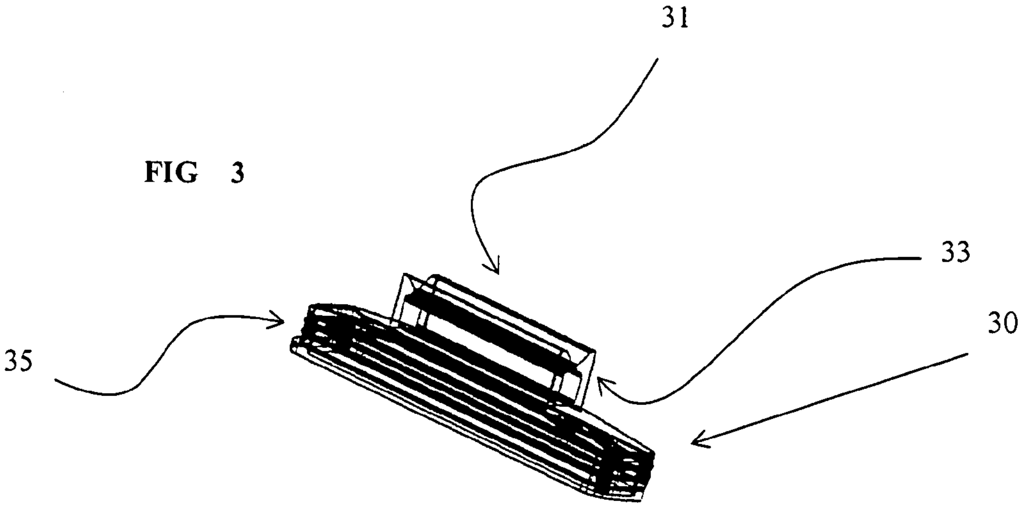
FIG. 3 is a side perspective view of the unique plug/seal of the ALLEY-auto sealing, tamper-proof screening, testing and storage apparatus shown in FIG. 1.

The lid 20 has a cassette slot 26 and receptacle 24 as shown in FIG. 2 to which the plug 30 is adapted. Referring now to FIG. 3, the plug 30 has sealing lips 35 that are designed to frictionally seal the cassette slot 26. After the lid 20 is attached to container 40, the specimen inside the container 40 is secured for transport and future testing.

The plug 30 also has a gripping jaw 31 that extends partially into the slot 26 of the lid 20. The jaw 31 is flexible and its purpose will be evident at least from the description that follows.

When the specimen is to be tested, a specially designed cassette 10 may be utilized to access the specimen without opening the secured lid 20. Referring again to FIG. 1, cassette 10 has rapid test strips attached thereto.

In one embodiment illustrated herein, the test strips, are sandwiched between the thin, plastic that form the cassette 10. Viewing windows 11 are placed on one side of the plastic sheets so that the provided test results may be read. Wicks 13 of the test cassette 10 are attached to the bottom ends of the test strips and will be submerged into the specimen, the wick 13 absorbs a small amount of the specimen and delivers the small amount to the test strips thus, activating the test strips.

The cassette 10 is designed to slide through the slot 26 located on the top surface 22 of lid 20. The cassette 10 has a leading edge receiving aperture 15. The receiving aperture 15 is designed to communicate with the jaw 31 of plug 30. When the cassette 10 engages the jaw 31, the leading edge of the cassette 10 forces open the jaws 31 until teeth 33 snap into the cassette's receiving apertures 15, thereby releasably locking the plug 30 to the cassette 10.

A downward force applied onto the cassette 10 will disengage plug 30 from the receptacle 24 of lid 20. The cassette 10 slides through slot 26 until wicks 13 are submerged in the specimen, thus activating a rapid test strips.

After the desired submersion time, the test cassette 10 may be pulled upward back through slot 26 of lid 20. Since teeth 33 of the plug 30 are gripping the end of the cassette 10 through receiving aperture 15, when the cassette 10 is removed from the specimen, the plug 30 is drawn upwards. Eventually the sealing lips 35 will engage the interior of receptacle 24 thereby aligning and once again securing the plug 30 to the cassette 10 by applying further force while withdrawing the cassette 10 the teeth 33 of plug 30 will open slightly thereby disengaging the receiving aperture 15 allowing the cassette to be completely withdrawn from the container 40.

It would be apparent to one skilled in the art, after reading the present disclosure, that modifications may be made to the basic invention. For example, FIGS. 4A and 4B illustrate the present invention modified to be used with a cylindrical cassette 70.

In this embodiment, apparatus 50 has a lid 55 adapted to a specimen container 57, a plug 58 that seals the lid 55, and a cassette 70. (This embodiment may be adapted to be used with any cylindrically-shaped cassette, but is particularly adapted to be used with the specimen testing apparatus described in U.S. application Ser. No. 10/002,313 filed Oct. 24, 2001.) The container 57 stores the specimen. In one embodiment, the container has threads on its outer surface proximate its open end that matingly engage the lid 55. A cup-shaped insert 56 is located inside the container 57 at its bottom.

The cassette 70 has a circular top portion 77 and an elongated tube 78 that is designed to be inserted into the container through a cylindrical opening 52 in the lid 55. The cassette 70 also has at least one test strip that lays flat against the circular top portion 77 and extends partially into the elongated tube 78. The end of the test strip(s) that extend into the tube 78 may have appropriate wicks to assist in absorbing the specimen.

The lid 55 has a cylindrical opening 52 adapted to communicate with both the round plug 58 and the elongated tube of cassette 70. Circumferentially located about the cylindrical opening 52 is an isolator shaft 54 that extends away from the lid 55 and has an open end. The isolator shaft 54 has a clip means proximate its open end for engaging the cup-shaped insert 56 of the container 57.

After a specimen is deposited into container 57, the lid 55 is screwed onto the container 57. As the lid 55 seals over the open end of the container 57, the isolator shaft 54 is immersed into the specimen and eventually snaps into the cup-shaped insert 56, therby physically isolating a portion of the specimen from the rest of the specimen. The majority of the specimen is retained between the outer surface of the isolator shaft 54 and the inner surface of the container 57. The portion of the specimen that is isolated within the isolator shaft 54 will eventually be used to "wet" the test strips within cassette 70.

Locking mechanism 72 shown in FIG. 4B performs a similar function as the aperture 15 of the previous embodiment. The cassette 70 enters through the cylindrical opening 52 of the lid 55. The locking mechanism 72 of cassette 70 engages the fingers 59 of plug 58, thereby allowing the plug 58 to move with the cassette 70 similar to the plug/cassette arrangement illustrated in the embodiment of FIG. 1.

When the plug 58 latches on to cassette 70, the further insertion of the cassette 70 will force the plug 58 to disengage from the end of the cylindrical opening 52 of lid 55 and the isolator shaft 54 will begin to be submerged into the isolated specimen within the isolator shaft 54. Eventually the plug 58 will frictionally engage the cup-shaped insert 56 and seat itself within the cup-shaped insert 56. When the isolator shaft 54 is sealed onto the isolator cup 56 there will be a portion of the specimen in both the inner isolator shaft 54 and a portion of specimen outside the isolator chamber. This isolator container provides the means necessary to split the sample. When the test cassette 70 is introduced to the apparatus 50 the test cassette will only contact the specimen within the inner isolator shaft 54, thus leaving an unadulterated portion of the specimen between the isolator shaft 54 and the interior of the speciment container 57 for future testing.

For example, if a positive result was obtained from the initial specimen, a second lab usually must confirm the results. At the second lab, the technician would remove the lid 55 from the specimen container. As the technician removes the lid 55, the isolator shaft 54 is permanently attached to the cup-shaped insert 56, thereby withdrawing the entire isolated portion of the specimen that was exposed to the original test strip(s). The remaining sample within the container 57 has never been exposed to any chemical reagents that may have been left by the first test strip(s). The remaining specimen would be unadulterated and may be used for future testing purposes.

Figure 5:
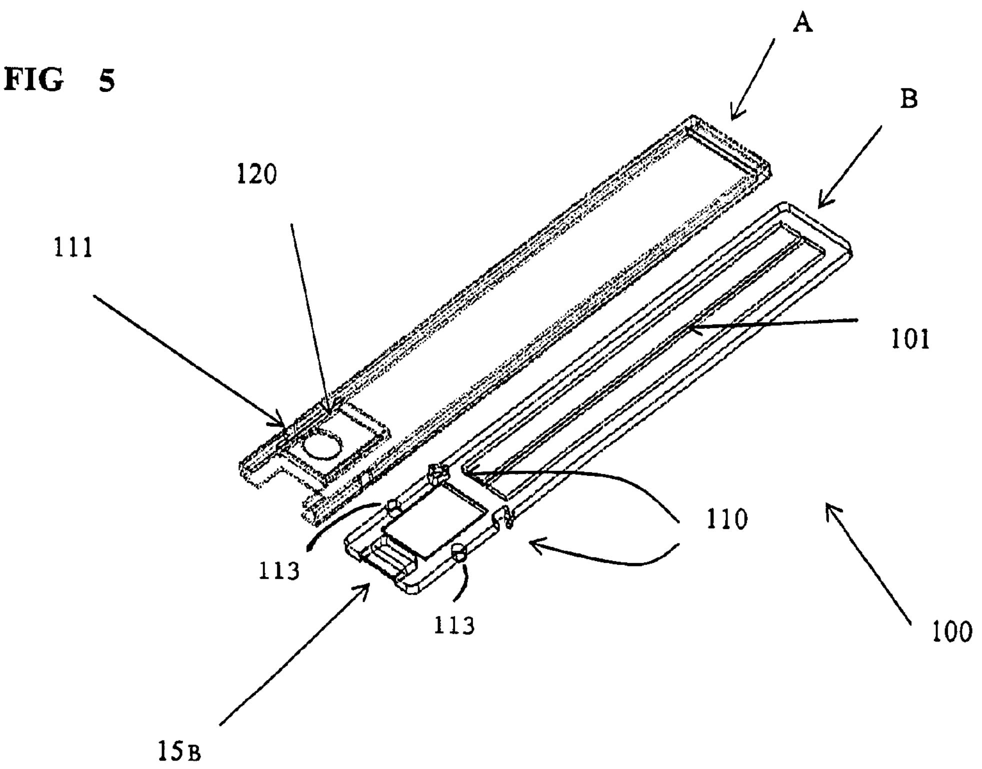
FIG. 5 is a perspective view of the specimen isolator cassette designed to split the tested specimen from the bulk specimen. It includes Cover A. and Cassette-Slide B. Cassette B is placed into Cover A during assembly.

Referring now to FIG. 5, a perspective view of a specimen isolator cassette 100 designed to split a tested specimen from a bulk specimen is shown. This embodiment of the cassette 100 includes cover A and cassette-Slide B and is intended to take the place of the cassette 10 illustrated in FIG. 1. Cassette-slide B is designed to slide into Cover A during assembly. This specialized cassette 100 splits a portion of the specimen from the remaining bulk specimen and prevents the bulk specimen from interacting with the test strips.

During assembly of cassette 100, test strips are placed into grooves 101 of cassette-slide B. Cassette-slide B is then slid into cover A. (Cover A has its bottom end open thus allowing cassette-slide B to be slid into this opening.) As cassette-slide B is inserted into cover A, ears 110 are bent inwards and slide smoothly within cover A; however, detents 113 on cassette-slide B engage cutouts 111 in cover A, thereby preventing the cassette-slide B from moving any further relative to cover A.

It is important to note that cassette-slide B also has ears 110 spaced a pre-determined distance away from detents 113. The reason for including ears 110 and their positioning relative to detents 113 will become apparent after reading the entire disclosure. Finally, a pad wick 120 is placed in a depression on the inside of cover A; however, the pad wick 120 does not physically touch the test strips 13.

Proximate the leading edge of the cassette is a receiving aperture 15B is designed to communicate with the jaw 31 of plug 30 in FIG. 1. When the cassette engages the jaw 31 they are forced around the leading edge of the cassette until jaw 31 snaps into the receiving apertures 15B.

A downward force applied to the cassette 100 will disengage plug 30 from the receptacle 24 of lid 20. The jaw 31 of plug 30 is now attached to the receiving aperture 15B of cassette 100. Eventually, the absorbent pad wick 120 will be submerged into the specimen. (Note this does not activate the test as in prior art cassettes). The absorbent pad wick 120 of cassette 100 is isolated from the test strips in grooves 101. After the absorbent pad wick 120 is wetted by the specimen within the container, the cassette 100 is removed from the bulk specimen container 40. As the cassette 100 is withdrawn from the container 40, the plug 30 again engages lid 20 and the sealing lips 35 close off the remainder of the specimen within the container 40. Further pulling on cassette 100 will then force cover A to move relative to cassette-slide B forcing the detents 113 to disengage the cutouts 111 until ears 110 lock into cutouts 111 thereby permanently locking cassette-slide B to cover A at a new pre-determined position. As cover A moves relative to cassette-slide B, the wetted wick 120 then moves onto the lower ends of the testing strips, thereby activating the diagnostic test. Simultaneously, the jaws 31 disengage cutout 15B thereby allowing the cassette 100 to be completely withdrawn from the container 40.

Referring again to FIG. 5, cassette 100 may be adapted to communicate with an over-cap that holds a small specimen and has means to conmiunicate with the receiving aperture 15B of the cassette slide B. Cassette 100 may also be activated by physically pulling outward or by pushing inward (thus reversing the strip pad configuration) on the leading edge mechanism.

The sample could be applied via dropper directly onto the absorbent wick 120. With an over-cap, reagents could also be adapted through a liquid bypass.

It should be noted that the cassette 100 could be adapted to work without the lid system of FIG. 1. Cassette-Slide B (tab) could extend up through cover A and, after the absorbent pad wick is wetted, the cassette may be removed from the bulk specimen and the tab can be pushed to activate the test, again never exposing the test strips to the bulk specimen.

It would be apparant to one skilled in the art, after reading the present disclosure, to modify the invention described herein by, for example, placing the test strips within 100 cover A and placing the absorbent pad wick on cassette-slide B.

In this particular embodiment, after the wick is wetted with a specimen, including saliva (or submerged into a cup) the cassette slide B, could be pulled upward, via tab or pushed (over-cap-with or without extra reagents) into the cover A, activating the test strips, again the bulk specimen never comes into contact with the test strips.

Although this invention has been described and illustrated by reference to specific embodiments, it will be apparent to those skilled in the art that various changes and modifications may be made which clearly fall within the scope of this invention. The present invention is intended to be protected broadly within the spirit and scope of the appended claims.

I claim:

1. An apparatus for testing a specimen, the apparatus comprising:

a container for holding a specimen;

a lid having means adopted to securely attach the lid to the container, said lid having a slot that allows objects to pass therethrough allowing access to the interior of the container;

a testing cassette having a leading edge, said cassette adapted to pass through said slot, with its leading edge first, said cassette also having a locking aperture proximate said leading edge; and a plug to which releasably and seal covers and seals said slot in order to prevent any specimen from escaping the container, the plug further including jaws that communicate with said locking aperture for releasably locking said plug onto said testing cassette when the testing cassette passes through said slot, said plug uncovers said slot when an appropriate pressure is applied through the cassette and moves in tandem with the cassette as the cassette enters the interior of the container;

and when said cassette is withdrawn from the container, the plug covers and reseals the slot while the jaws release said cassette.

2. The apparatus according to claim 1 further comprising at least one test strip mounted on said testing cassette, so that when said container holds a specimen and said cassette enters said container, said at least one test strip is exposed to the specimen.

3. An apparatus for testing a specimen, the apparatus comprising:

a container for holding a specimen;

a lid having means to securely attach the lid to the container, said lid having a slot that allows objects to pass therethrough which allows access to the interior of the container;

a plug that releasably covers and seals said slot in order to prevent any specimen that may be in the container from escaping;

a testing cassette having a leading edge and a locking aperture proximate said leading edge, said cassette adapted to pass through said slot with its leading edge first; and the plug further including jaws that communicate with said locking aperture for releasably locking said plug onto said testing cassette when the testing cassette passes through said slot, said plug uncovers said slot when an appropriate pressure is applied through the cassette and moves in tandem with the cassette as the cassette enters the interior of the container;

and when said cassette is withdrawn from the container, the plug covers and reseals the slot while the jaws release said cassette.

4. An apparatus for testing a specimen comprising:

a container for storing a specimen;

a lid that can be secured to the container after the specimen has been deposited in the container, said lid having a slot that allows objects to pass therethrough which allows access to the interior of the container; and a plug positioned inside the container that releasably covers and seals said slot in order to prevent any specimen that may be in the container from escaping;

a test cassette including a cassette-slide being movable relative to an elongated, hollow cover, said cover having a first end and a second end, the first end of said cover being open, said cover having at least one cutout proximate the open end;

said cassette-slide sized to be inserted and slid into said cover, said cassette-slide having a first end and a second end, the cassette-slide having grooves extending proximately from the second end of the cassette-slide towards the first end of the cassette-slide for securing at least one reactive test strip, said cassette-slide having at least one flexible ear located proximate the first end of the cassette-slide and at least one detent located between the first end and said at least one flexible ear, the detent and ear communicate with said at least one cutout on the cover so that when the second end of the cassette-slide is inserted into said open end of the cover and slid into said cover, the ear will deflect and pass over said cutout but said detent will engage the cutout to resist any further sliding of the cassette-slide relative to the cover, a pad for absorbing any specimen with which it comes in contact, said pad attached proximate the first end of the cover on the cover's interior, the pad is located so that when the cassette-slide is inserted into the cover it may be slid until said detent engages said at least one cutout in the cover, and any test strip secured in the grooves are initially isolated from the pad;

said cassette-slide having a locking aperture proximate its first end, said cassette adapted to pass through said slot; and the plug further including jaws that communicate with said locking aperture for releasably locking said plug onto said cassette-slide when the cassette passes through said slot, said plug uncovers said slot when an appropriate pressure is applied through the cassette, the plug moving in tandem with the cassette as the cassette enters the interior of the container;

and after said pad absorbs any specimen that may be present in the container, said cassette is withdrawn from the container by pulling, said plug being carried with said cassette-slide until said plug reseats itself over the slot, thereby resealing the slot, said jaws continue to communicate with said locking aperture producing a force on said cassette-slide sufficient to release the detent from said at least one cutout causing the cassette-slide to move relative to the cover until said ear grabs said at least one cutout and fixedly secures the cassette-slide to the cover simultaneously bringing any test strips that may be secured in the groove in contact with the pad so that at least a portion of the absorbed specimen is transferred to said test strips thereby activating the test strips, and after the cassette is completely withdrawn from the container the jaws release said cassette-slide.

5. The apparatus of claim 4 wherein said at least one cutout is exactly two diametrically opposed cutouts.

* * * * *